(12) United States Patent
Takahashi

(10) Patent No.: US 7,792,355 B2
(45) Date of Patent: Sep. 7, 2010

(54) IMAGE PROCESSING APPARATUS, IMAGE PROCESSING METHOD, AND IMAGE CAPTURING APPARATUS

(75) Inventor: Kenji Takahashi, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 11/683,505

(22) Filed: Mar. 8, 2007

(65) Prior Publication Data

US 2007/0273769 A1 Nov. 29, 2007

(30) Foreign Application Priority Data

Mar. 30, 2006 (JP) ............................. 2006-095851

(51) Int. Cl.
*G06K 9/00* (2006.01)
(52) U.S. Cl. .................................... 382/167
(58) Field of Classification Search ................ 382/162, 382/163, 167; 396/155, 157, 158
See application file for complete search history.

(56) References Cited

U.S. PATENT DOCUMENTS

| | | | |
|---|---|---|---|
| 5,043,809 A | 8/1991 | Shikakura et al. | 358/133 |
| 5,125,041 A | 6/1992 | Kimura et al. | 382/44 |
| 5,333,015 A | 7/1994 | Harigaya et al. | 348/578 |
| 5,493,418 A | 2/1996 | Takahashi et al. | 358/451 |
| 6,285,410 B1 | 9/2001 | Marni | 348/576 |
| 6,343,137 B1 | 1/2002 | Kimura et al. | 382/100 |
| 6,381,034 B2 | 4/2002 | Iwasaki et al. | 358/1.9 |
| 6,504,960 B2 | 1/2003 | Takahashi | 382/305 |
| 7,289,664 B2 * | 10/2007 | Enomoto | 382/167 |
| 7,636,477 B2 * | 12/2009 | Terakawa | 382/209 |
| 2003/0142285 A1 | 7/2003 | Enomoto | 355/77 |
| 2004/0041924 A1 | 3/2004 | White et al. | 348/239 |
| 2004/0239810 A1 | 12/2004 | Takahashi | 348/565 |
| 2005/0140803 A1 | 6/2005 | Ohtsuka et al. | 348/239 |
| 2005/0146639 A1 | 7/2005 | Onuki | 348/371 |
| 2005/0152618 A1 | 7/2005 | Takahashi | 382/294 |
| 2005/0163498 A1 | 7/2005 | Battles et al. | 396/158 |
| 2005/0280717 A1 | 12/2005 | Sugimoto | 348/222.1 |

FOREIGN PATENT DOCUMENTS

| | | |
|---|---|---|
| CN | 1638443 A | 7/2005 |
| CN | 1717011 A | 1/2006 |

(Continued)

OTHER PUBLICATIONS

Chinese Notification of First Office Action dated Jun. 6, 2006, regarding Application No. 2007100875802.

(Continued)

*Primary Examiner*—Jose L Couso
(74) *Attorney, Agent, or Firm*—Fitzpatrick, Cella, Harper & Scinto

(57) ABSTRACT

This invention can more accurately correct a region in the screen, which suffers a red-eye effect. An image processing apparatus including a processing circuit which executes correction processing for correcting a region in a target image, which satisfies a condition that defines a correction target, comprises a determination circuit which determines whether the target image has already undergone the correction processing, and a correction suppression circuit which suppresses execution of the correction processing for the target image when said determination circuit determines that the target image has already undergone the correction processing.

11 Claims, 17 Drawing Sheets

FOREIGN PATENT DOCUMENTS

| | | |
|---|---|---|
| EP | 1 499 111 A2 | 1/2005 |
| JP | 10-232934 | 9/1998 |
| JP | 10-233929 | 9/1998 |
| JP | 2000-048184 | 2/2000 |
| JP | 2001-309225 | 11/2001 |
| JP | 3684017 | 8/2005 |

OTHER PUBLICATIONS

European Search Report issued in counterpart application No. 07104903.5 dated June 15, 2010—6 pages.

* cited by examiner

F I G. 15
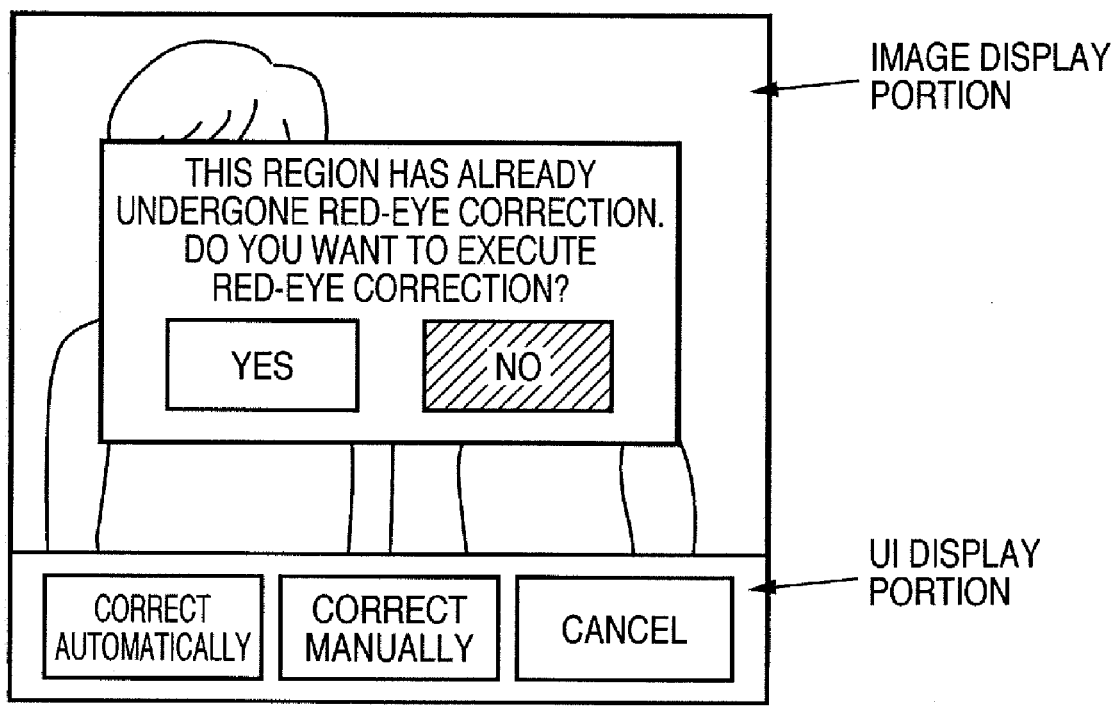

IMAGE PROCESSING APPARATUS, IMAGE PROCESSING METHOD, AND IMAGE CAPTURING APPARATUS

BACKGROUND OF THE INVENTION

1. Field of the Invention

The present invention relates to a technique for correcting a red-eye effect generated in an image captured by an image capturing apparatus such as a digital camera.

2. Description of the Related Art

Conventionally, there are commercially available image capturing apparatuses such as digital cameras which record and play back still images using, as a recording medium, a memory card having a solid-state memory element.

Conventional cameras which use a silver halide film suffer a red-eye effect in which when the user takes a picture of a person using an electronic flash, the image capturing apparatus records an eye in red. This red-eye effect is a phenomenon in which the electronic flash light that has entered one's pupil reflects the blood vessels of the retina. Especially in a dark place, the red-eye effect is more likely to occur because the pupil of the eye is open. To solve this problem, even the conventional silver halide cameras irradiate the object using a lamp or LED or electronic flash pre-emission before image capture to contract the pupil at the time of image capture, thereby reducing the red-eye effect. However, it is difficult to completely eliminate the red-eye effect because a red-eye reduction effect is small unless the object person intently gazes at the photographer.

Even digital cameras suffer a similar red-eye effect upon electronic-flash image capture. Like the silver halide cameras, the conventional digital cameras take a red-eye reduction measure by irradiating the object with light before image capture, but they cannot completely avoid a red-eye effect upon image capture. Therefore, the user must manually correct the generated red-eye in the captured digital image by using image processing software or the like.

In view of this, there is proposed an image processing apparatus which automatically detects the positions of the face and eye of a person, and, if a red-eye effect occurs, corrects the red-eye automatically or in a semiautomatic manner based on the detected information. For example, there is available a technique for detecting a face by extracting a flesh color region to detect a red-eye within the detected face region (see Japanese Patent Laid-Open. 10-233929).

There is also proposed a camera which detects a face using pattern matching together with an algorithm for comparing the face probability with a face shape model (see Japanese Patent Laid-Open No. 2001-309225).

Unfortunately, it is technically very difficult to automatically detect and correct all portions of faces in the image, which suffer a red-eye effect. For example, when one takes a picture of a plurality of persons, the faces of all members cannot necessarily be detected in a method of correcting a red-eye by detecting a face using pattern matching together with an algorithm for comparing the face probability with a face shape model. That is, this method may fail to detect the face of a person who is looking away, so red-eyes in the faces of some persons that cannot be detected may remain uncorrected, or a method of correcting a red-eye by discriminating a flesh color to specify a face region may lead to unnatural correction when a lip is mistaken for a red-eye. Also, a method of automatically detecting and correcting a red-eye may fail to accurately detect a red-eye region when a red-eye in a corrected image is detected again. A case in which the image records a person who has a red-tinted eyelid edge because his/her blood vessels are seen through will be described as an example. Before red-eye correction, the red-pupil is more recognizable as a red-eye than the eyelid edge, so erroneous detection is less likely to occur. However, since no red-eye exists after red-eye correction, the red-tinted eyelid edge adjacent to the eye is more likely to be recognized as a red-eye than when the red-eye actually exists. This may lead to erroneous correction (correction of a region other than a red-eye) for an image which has already undergone red-eye correction.

SUMMARY OF THE INVENTION

The present invention has been made in consideration of the above problems, and has as its object to make it possible to more accurately correct a region in the screen which suffers a red-eye effect.

In order to solve the above problems and to achieve the object, according to a first aspect of the present invention, there is provided an image-processing apparatus including a processing circuit which executes correction processing for correcting a region in a target image, which satisfies a condition that defines a correction target, comprising a determination circuit which determines whether the target image has already undergone the correction processing, and a correction suppression circuit which suppresses execution of the correction processing for the target image when the determination circuit determines that the target image has already undergone the correction processing.

According to a second aspect of the present invention, there is provided an image-capturing apparatus including an image sensor which photoelectrically converts an object image, a storage circuit which stores the image sensed by the image sensor, and a processing circuit which executes correction processing for correcting a region in a target image, which satisfies a condition that defines a correction target, comprising a determination circuit which determines whether the target image has already undergone the correction processing, and a correction suppression circuit which suppresses execution of the correction processing for the target image when the determination circuit determines that the target image has already undergone the correction processing.

According to a third aspect of the present invention, there is provided an image-processing method including a correction step of correcting a region in a target image, which satisfies a condition that defines a correction target, comprising a determination step of determining whether the target image has already undergone correction in the correction step, and a correction suppression step of suppressing execution of correction for the target image in the correction step when it is determined in the determination step that the target image has already undergone correction in the correction step.

Further features of the present invention will become apparent from the following description of exemplary embodiments (with reference to the attached drawings).

BRIEF DESCRIPTION OF THE DRAWINGS

FIG. 15 is a view showing a window to select whether to execute or cancel red-eye correction.

DESCRIPTION OF THE EMBODIMENT

A preferred embodiment of the present invention will be described in detail below with reference to the accompanying drawings.

In this embodiment, processing for correcting a red-eye image captured by a digital camera will be explained.

Figure 1:
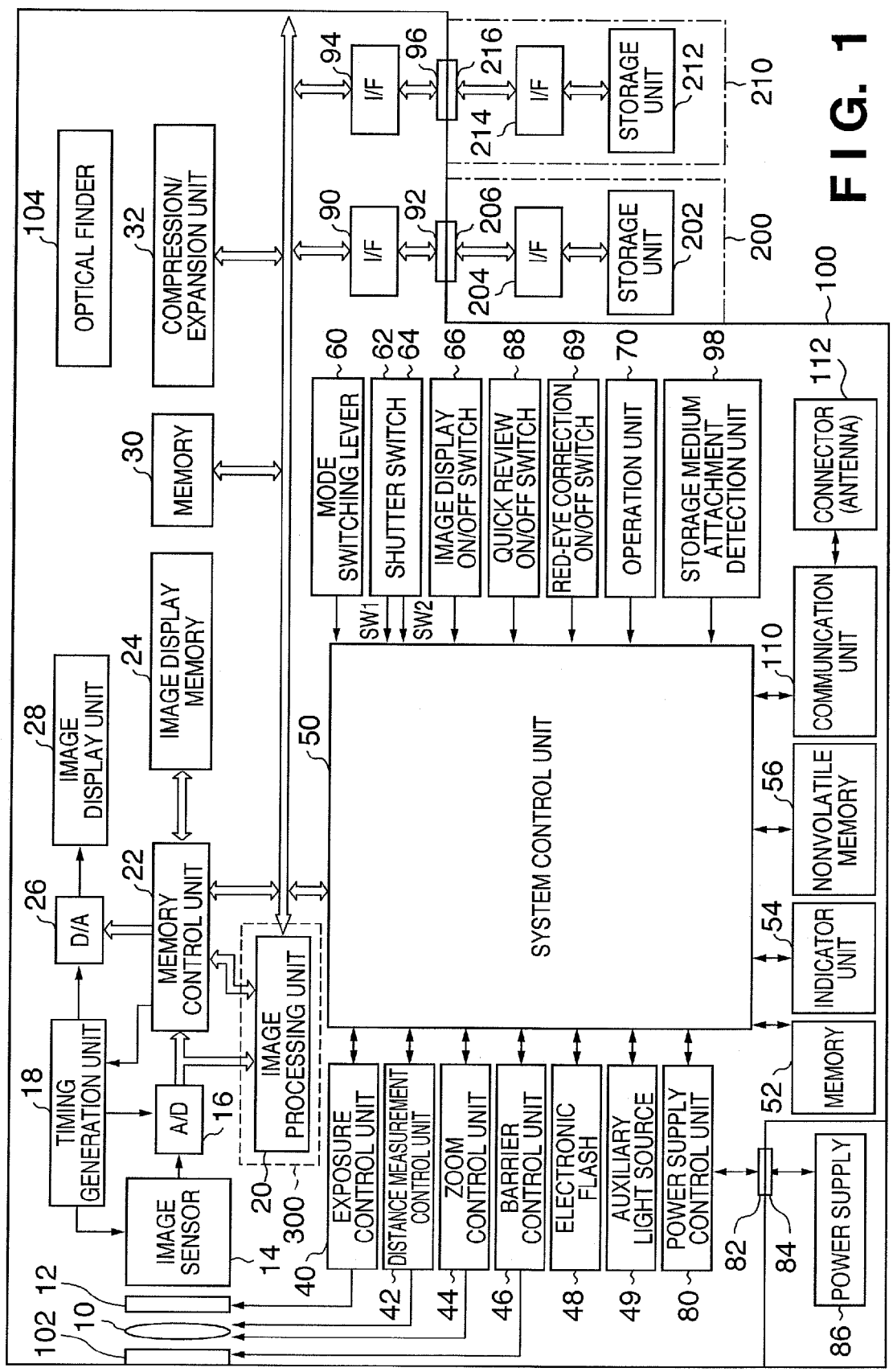
FIG. 1 is a block diagram showing the configuration of a digital camera according to an embodiment of the present invention.

FIG. 1 is a block diagram showing the configuration of a digital camera (image processing apparatus) 100 according to an embodiment of the present invention.

Referring to FIG. 1, reference numeral 10 denotes a photographing lens; 12, a shutter; 14, an image sensor which converts an optical image into an electrical signal; and 16, an A/D converter which converts the analog signal output from the image sensor 14 into a digital signal. A timing generation unit 18 supplies a clock signal or control signal to the image sensor 14, the A/D converter 16, and a D/A converter 26 to control their operations. A memory control unit 22 and system control unit 50 controls the timing generation unit 18. An image-processing unit 20 executes predetermined pixel-interpolation processing or color-conversion processing for the data from the A/D converter 16 or the data from the memory control unit 22. The image-processing unit 20 also executes predetermined arithmetic processing using captured image data. Based on the obtained arithmetic result, the system control unit 50 executes AF (Auto Focus) processing, AE (Auto Exposure) processing, and EF (Electronic-Flash pre-emission) processing of a TTL (Through The Lens) scheme to control an exposure-control unit 40 and a distance-measurement control unit 42. The image-processing unit 20 also executes predetermined arithmetic processing using the captured image data and executes AWB (Auto White Balance) processing of the TTL scheme based on the obtained arithmetic result.

The memory control unit 22 controls the A/D converter 16, the timing-generation unit 18, an image-display memory 24, the D/A converter 26, a memory 30, and a compression/expansion unit 32. The digital data converted by the A/D converter 16 is written in the image-display memory 24 or memory 30 through the image-processing unit 20 and memory control unit 22, or directly through the memory control unit 22.

The image-display memory 24 stores data to be displayed on an image-display unit 28. The data stored in the image-display memory 24 is output and displayed on the image-display unit 28 such as a TFT or LCD through the D/A converter 26. The image-display unit 28 can implement an electronic viewfinder function by sequentially displaying the captured image data. The image-display unit 28 can turn on/off display in accordance with an instruction from the system control unit 50. Turning off display makes it possible to greatly reduce the power consumption of the digital camera 100.

The memory 30 stores a captured still image or moving image. The memory 30 has a storage capacity large enough to store a predetermined number of still images or a moving image corresponding to a predetermined period of time. Even in panoramic photography or continuous shooting for continuously taking a plurality of still images, a large quantity of images can be quickly written in the memory 30. The memory 30 can also be used as a work area of the system control unit 50. The compression/expansion unit 32 compresses/expands image data by, e.g., ADCT (Adaptive Discrete Cosine Transform) or Wavelet Transform. That is, the compression/expansion unit 32 can load image data stored in the memory 30 and compress it, or load compressed image data and expand it to write the processed data in the memory 30.

The exposure-control unit 40 controls the shutter 12 having a stop function. The exposure-control unit 40 also has a flash-brightness control function which operates in cooperation with an electronic flash unit 48. The distance-measurement control unit 42 controls focusing of the lens 10 to detect the distance from the focusing position of the lens 10 to the object. A zoom control unit 44 controls zooming of the lens 10. A barrier control unit 46 controls the operation of a protection unit 102. The electronic flash unit 48 also has an AF auxiliary light projecting function and a flash-light control function. The exposure-control unit 40 and distance-measurement control unit 42 are controlled by the TTL scheme. Based on an arithmetic result obtained by processing captured image data by the image-processing unit 20, the system control unit 50 controls the exposure-control unit 40, distance-measurement control unit 42, and barrier control unit 46. An auxiliary light source 49 is used as an auxiliary light source for display in a dark place, as an auxiliary light for the distance measurement control unit 42, and as an illumination lamp for red-eye reduction.

The system control unit 50 controls the overall operation of the digital camera 100. A memory 52 stores constants, variables, and programs for the operations of the system control unit 50, and is also used as a working memory. An indicator unit 54 such as a liquid crystal display or a speaker indicates the operation state or a message using characters, images, or sound in accordance with the execution of a program by the system control unit 50. One or a plurality of indicator units 54 are arranged at visible positions near an operation unit 70 of the digital camera 100. The indicator unit 54 includes a combination of, e.g., an LCD, LED, and sound generation element. Some of the functions of the indicator unit 54 are arranged in an optical viewfinder 104. Of the indication contents of the indicator unit 54, examples of indication on the LCD or the like are the single shot/continuous shooting mode, self timer, compression ratio, number of recording pixels, number of recorded images, number of recordable images, shutter speed, F-number, exposure compensation, electronic flash, red-eye effect reduction, red-eye correction, macro photography, buzzer setting, timer battery level, battery level, error, information by a plurality of digits, attached state of a storage medium 200 or 210, operation of a communication I/F, and date/time. Of the indication contents of the indicator unit 54, examples of indication in the optical viewfinder 104 are in-focus, camera shake warning, electronic flash charge, shutter speed, F-number, and exposure compensation.

A nonvolatile memory 56 is an electrically erasable/recordable (storable) memory such as an EEPROM. A mode-switching lever 60, shutter switches 62 and 64, an image-display ON/OFF switch 66, a quick review ON/OFF switch 68, and the operation unit 70 are manipulation units to input various kinds of operation instructions for the system control unit 50. They include single devices such as a switch, dial, touch panel, or pointing by detection of a line of sight, and voice-recognition device, or a combination of a plurality of devices.

These manipulation units will be described here in detail.

The mode-switching lever 60 can selectively set function modes such as power off, playback mode, moving-image capture mode, and still-image capture mode.

The shutter switch SW1 62 is turned on midway during the operation of a shutter button 303 (see FIG. 2) and gives the instruction for the start of an operation such as AF (Auto Focus) processing, AE (Auto Exposure) processing, or AWB (Auto White Balance) processing. The shutter switch SW2 64 is turned on at the end of operation of the shutter button 303 and gives the instruction for the start of control of light emission of the electronic flash unit 48 in an electronic-flash image-capture mode. The shutter switch SW2 64 also instructs the start of exposure processing for writing a signal read out from the image sensor 14 in the memory 30 as image data through the A/D converter 16 and memory control unit 22. The shutter switch SW2 64 also gives the instruction for the start of development processing using arithmetic processing by the image-processing unit 20 or memory control unit 22. The shutter switch SW2 64 also gives the instruction for the start of recording (storage) processing for reading out the image data from the memory 30, detecting and correcting a red-eye, causing the compression/expansion unit 32 to compress the image data, and writing the image data to the storage medium 200 or 210.

The image-display ON/OFF switch 66 can turn the image-display unit 28 ON or OFF. This function allows power saving by stopping current supply to the image-display unit 28 including a TFT and LCD in image capture using the optical viewfinder 104.

The quick review ON/OFF switch 68 sets a quick-review function of automatically playing back captured-image data immediately after image capture. In this embodiment, the quick-review function is set when the image-display unit 28 is OFF.

A red-eye correction ON/OFF switch 69 sets whether to use a red-eye correction function of detecting and correcting a red-eye region in a captured image. In this embodiment, a red-eye is detected and corrected when the red-eye correction ON/OFF switch 69 is ON.

The operation unit 70 includes various kinds of buttons and a touch panel. The operation unit 70 has a menu button, set button, macro button, multi-window playback page-break button, electronic-flash setting button, single shot/continuous shot/self-timer switching button, menu move+(plus) button, menu move−(minus) button, playback image move+(plus) button, playback image move − (minus) button, captured-image-quality selection button, exposure-compensation button, date/time-setting button, red-eye reduction button, red-eye editing button, and red-eye correction print button.

A power-supply control unit 80 includes a battery-detection unit, DC/DC converter, and switch unit which selects a block to be energized. The power-supply control unit 80 detects the presence/absence of a battery, battery type, and battery level, controls the DC/DC converter based on the detection result and an instruction from the system control unit 50, and supplies a necessary voltage to the units including a storage medium for a necessary period. Reference numerals 82 and 84 denote connectors. A power supply 86 comprises a primary battery such as an alkaline battery or lithium battery, a secondary battery such as an NiCd battery, NiMH battery, or Li-ion battery, or an AC adapter.

Reference numerals 90 and 94 denote interfaces to the storage media such as a memory card and hard disk; and 92 and 96, connectors which connect to the storage media such as a memory card and hard disk. A storage-medium-attachment detection unit 98 detects whether the storage medium 200 or 210 is attached to the connector 92 or 96.

This embodiment will be described assuming that the apparatus has two systems of interfaces and connectors to which storage media are attached. The apparatus may have one or a plurality of systems of interfaces and connectors to which storage media are attached. In addition, interfaces or connectors of different standards may be combined. Interfaces and connectors based on a standard such as a PCMCIA card or CF (compact flash®) card may be used.

When the interfaces 90 and 94 and connectors 92 and 96 used are based on a standard such as a PCMCIA card or CF (compact flash®) card, the following processing can be executed. That is, various kinds of communication cards such as a LAN card, modem card, USB card, IEEE1394 card, P1284 card, SCSI card, or communication card for PHS are connected. This makes it possible to transfer image data or management information associated with the image data to/from another computer or a peripheral device such as a printer.

The protection unit 102 serves as a barrier which covers the image-capturing unit including the lens 10 of the digital camera 100 to prevent any dirt contamination or damage to the image-capturing unit. Image capture can be executed using only the optical viewfinder 104 without using the electronic viewfinder function of the image-display unit 28. The optical viewfinder 104 incorporates some functions of the indicator unit 54, including, e.g., in-focus indication, camera shake warning indication, electronic-flash charge indication, shutter-speed indication, F-number indication, and exposure-compensation indication. A communication unit 110 has various kinds of communication functions such as RS232C, USB, IEEE1394, P1284, SCSI, modem, LAN, and wireless communication. An antenna (connector) 112 connects the digital camera 100 to another device via the communication unit 110, and serves as a connector for wired communication and serves as an antenna for wireless communication.

The storage medium 200 includes a memory card or hard disk. The storage medium 200 comprises a storage unit 202 including a semiconductor memory or magnetic disk, an interface 204 to the digital camera 100, and a connector 206 which connects to the digital camera 100. The storage medium 210 includes a memory card or hard disk. The storage medium 210 comprises a storage unit 212 including a semiconductor memory or magnetic disk, an interface 214 to the digital camera 100, and a connector 216 which connects to the digital camera 100.

Figure 2:
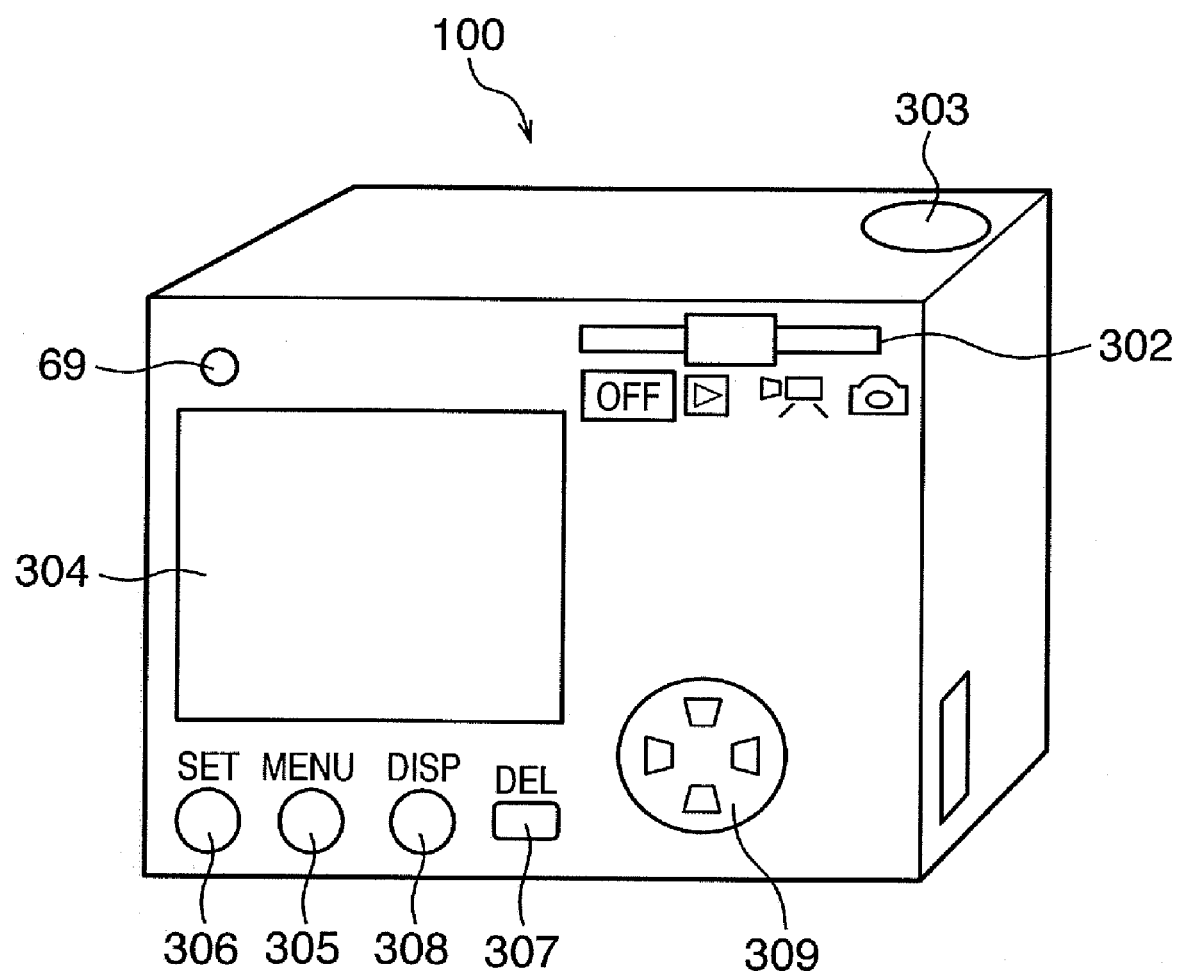
FIG. 2 is a perspective view showing the outer appearance of the digital camera according to the embodiment.

FIG. 2 is a perspective view showing the outer appearance of the digital camera according to this embodiment.

Reference numeral 302 denotes a mode-switching lever which can selectively set function modes such as power off, playback mode, moving-image capture mode, and still-image capture mode. The mode-switching lever 302 corresponds to the mode-switching lever 60 shown in FIG. 1. Reference numeral 303 denotes a shutter button. An image-display unit 304 displays an image captured by the camera. Normally, the image-display unit 304 is an LCD (Liquid Crystal Display), so it will be referred to as an LCD hereinafter. The image-display unit 304 corresponds to the image-display unit 28 shown in FIG. 1. The LCD 304 also displays windows for playing back a still image and/or moving image. Reference numeral 305 denotes a MENU button used to enter and exit a menu window to change image-capturing parameters and camera settings. Reference numeral 306 denotes a SET button used to, e.g., decide a menu. Reference numeral 307 denotes a DELETE button which allows designation of image deletion. Reference numeral 308 denotes a DISP button used to select whether to output the display on the LCD 304. The DISP button 308 corresponds to the image-display ON/OFF switch 66 shown in FIG. 1. Reference numeral 309 denotes a cross button used to move an item on the menu window via the up, down, left, and right buttons or to feed an image by pressing the left and right buttons in a playback mode. Reference numeral 69 denotes a red-eye correction ON/OFF switch used to enter a mode of correcting a red-eye in a captured image.

Figure 3A:
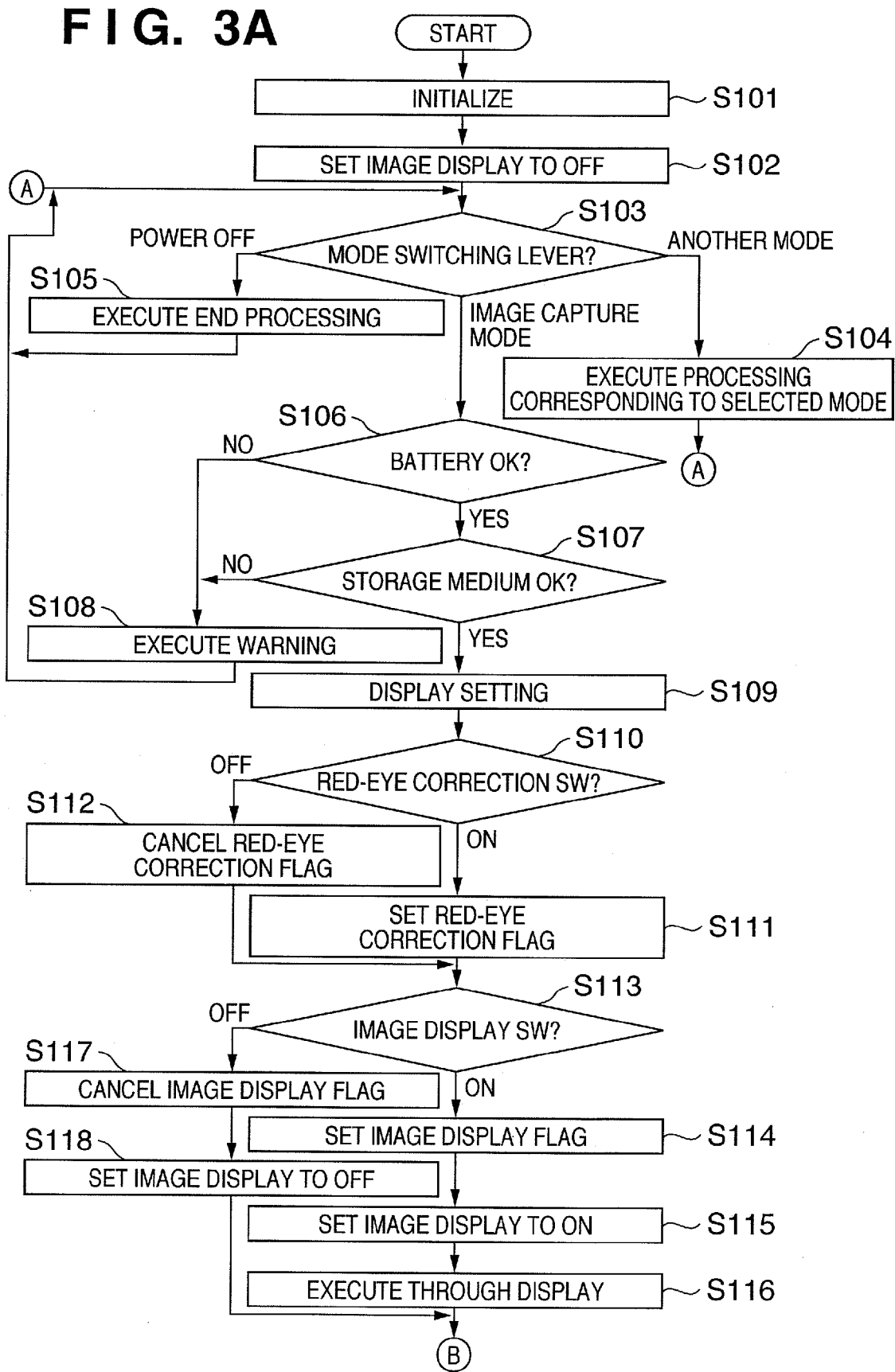
FIG. 3A is a flowchart for explaining the operation of the digital camera according to the embodiment in a main processing routine.
Figure 3B:
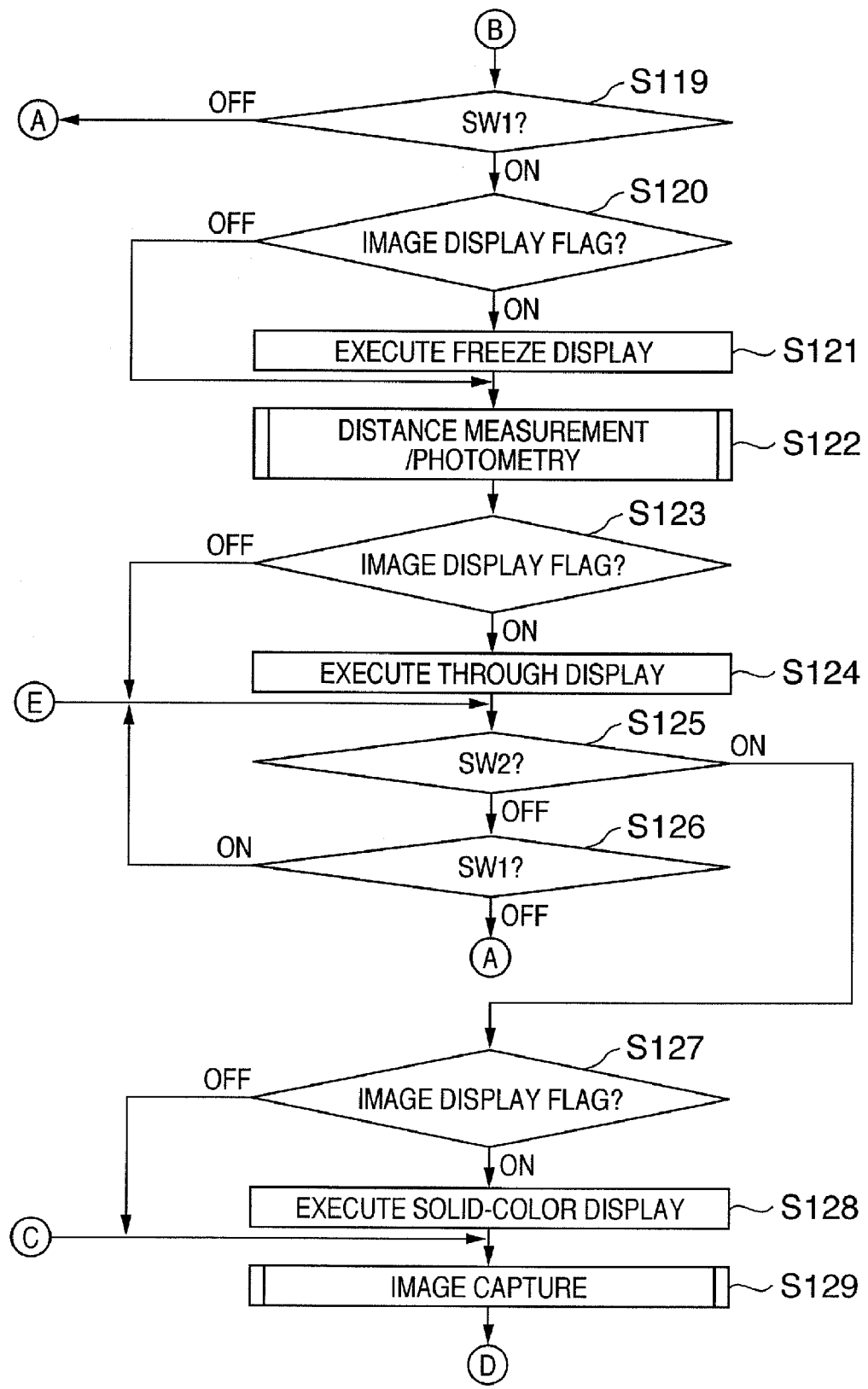
FIG. 3B is a flowchart for explaining the operation of the digital camera according to the embodiment in the main processing routine.
Figure 3C:
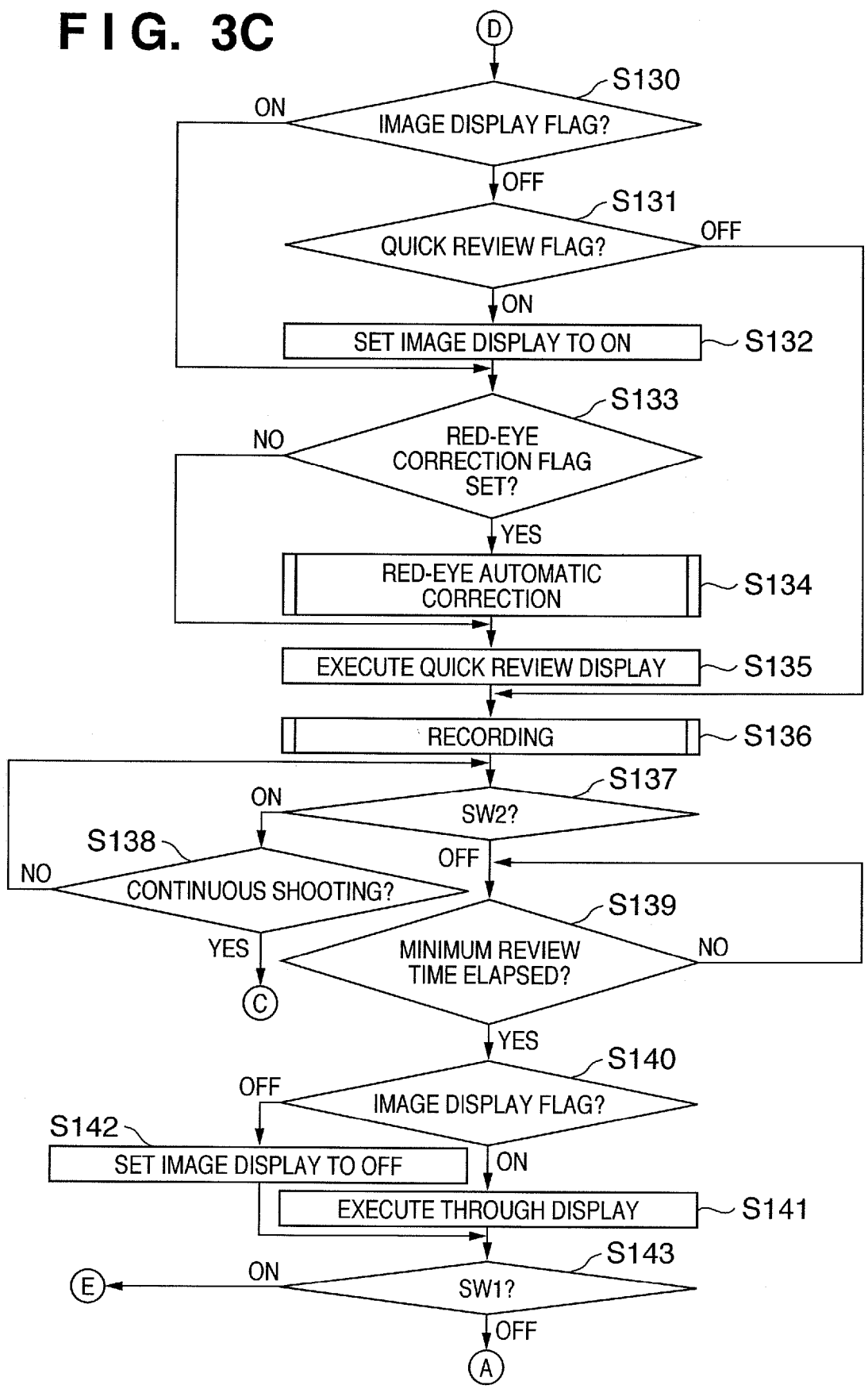
FIG. 3C is a flowchart for explaining the operation of the digital camera according to the embodiment in the main processing routine.

FIGS. 3A to 3C are flowcharts for explaining the operation of the digital camera 100 according to this embodiment in a main processing routine.

This processing starts when the apparatus is powered on after, e.g., loading a new battery. In step S101, the system control unit 50 initializes various flags and control variables of the memory 52. In step S102, the system control unit 50 initializes display of the image-display unit 28 and indicator unit 54 to OFF. In step S103, the system control unit 50 determines the set position of the mode-switching lever 60. If the mode-switching lever 60 is set to power OFF, the process advances to step S105 to change the display states of the display units to the end state. The barrier of the protection unit 102 is closed to protect the image-capturing unit. The nonvolatile memory 56 stores necessary parameters, set values, and set modes, including flags and control variables. The power-supply control unit 80 cuts off unnecessary power of the units of the digital camera 100, including the image-display unit 28. After the predetermined end processing is executed, the process returns to step S103.

If the mode switching lever 60 is set to image-capture mode in step S103, the process advances to step S106. If the mode-switching lever 60 is set to any other mode, the process advances to step S104 to execute processing corresponding to the mode selected by the mode-switching lever 60. After the end of the processing, the process returns to step S103.

If the mode-switching lever 60 is in an image-capture mode, the process advances to step S106 to determine whether the level or operation situation of the power supply 86 including a battery or the like is OK, based on the signal from the power-supply control unit 80. If the result is NO in step S106, the process advances to step S108 to cause the indicator unit 54 to execute predetermined warning indication by an image or sound. The process returns to step S103.

If the result is YES in step S106, the process advances to step S107 to determine whether the operation state of the storage medium 200 or 210 is OK for the operation of the digital camera 100, particularly the image-data storage/playback operation for the storage medium. If the result is NO in step, S107, the process advances to step S108 to cause the indicator unit 54 to execute a predetermined warning indication by an image or sound. The process returns to step S103.

If the result is YES in step S107, the process advances to step S109 to cause the indicator unit 54 to execute UI display of various set states of the digital camera 100 by an image or sound. If image display of the image-display unit 28 is ON (if the image-display ON/OFF switch 66 is ON), even the image-display unit 28 may execute UI display of various set states of the digital camera 100 by an image or sound. The user thus makes various settings.

In step S110, the set state of the red-eye correction ON/OFF switch 69 is checked. If red-eye correction is ON, the process advances to step S111 to turn on a red-eye correction flag. If the red-eye correction ON/OFF switch is OFF, the process advances to step S112 to turn off the red-eye correction flag.

The process advances to step S113 to check the set state of the image-display ON/OFF switch 66. If image display is ON, the process advances to step S114 to turn on an image-display flag of the memory 52. In step S115, image display of the image-display unit 28 is set to ON. Furthermore, in step S116, a digital viewfinder (through display) state that sequentially displays image data sensed by the image sensor 14 is set. The process advances to step S119 in FIG. 3B. In the digital viewfinder state, data which is sequentially written in the image-display memory 24 through the image sensor 14, A/D converter 16, image-processing unit 20, and memory control unit 22 is sequentially displayed on the image-display unit 28 through the memory control unit 22 and D/A converter 26. This implements an electronic viewfinder function.

If the image-display ON/OFF switch 66 is in an image-display-OFF state in step S113, the process advances to step S117 to turn off the image-display flag and to step S118 to set display of the image-display unit 28 to OFF. The process advances to step S119. When image display is OFF, image capture is performed using the optical viewfinder 104 without using the electronic-viewfinder function of the image-display unit 28. This makes it possible to reduce the power consumed by the image-display unit 28 and D/A converter 26, which consume a large amount of power.

It is checked in step S119 whether the shutter switch SW1 62 is pressed. If the shutter switch SW1 62 is pressed, the process returns to step S103. If the shutter switch SW1 62 is pressed, the process advances to step S120 to see if the image-display flag is ON. If the image-display flag is ON, the process advances to step S121 to set the display state of the image-display unit 28 to a freeze-display state. The process advances to step S122. In the freeze-display state, rewrite of image data into the image-display memory 24 through the image sensor 14, A/D converter 16, image-processing unit 20, and memory control unit 22 is inhibited. The image-display unit 28 displays the finally written image data through the memory control unit 22 and D/A converter 26, thereby displaying a frozen video image on the optical viewfinder 104.

If the image-display flag is OFF in step S120, the process advances to step S122. In step S122, the lens 10 is focused on the object by executing distance measurement, and the F-number and shutter speed are decided by executing photometry. An electronic flash is set in this photometry, as needed.

When the distance measurement/photometry is completed in step S122, the process advances to step S123 to determine the state of the image-display flag. If the image-display flag is ON, the process advances to step S124 to set the display state of the image-display unit 28 to a digital-viewfinder state. The process advances to step S125. The digital-viewfinder state in step S124 is the same as the digital-viewfinder state in step S116.

If the shutter switch SW2 64 is not pressed in step S125, and the shutter switch SW1 62 is turned off, the process returns to step S103 in FIG. 3A.

If the shutter switch SW2 64 is pressed in step S125, the process advances to step S127 to determine whether the image-display flag is ON. If the image-display flag is ON, the process advances to step S128 to set the display state of the image-display unit 28 to a solid-color display state. The process advances to step S129. In the solid-color display state, the image-display unit 28 does not display any captured-image data written in the image-display memory 24 through the image sensor 14, A/D converter 16, image-processing unit 20, and memory control unit 22. Instead, the image-display unit 28 displays the replaced image data of solid color through the memory control unit 22 and D/A converter 26. The electronic viewfinder displays the video image of solid color in this manner.

If the image-display flag is OFF in step S127, the process advances to image-capturing processing in step S129. In step S129, exposure processing for writing captured-image data into the memory 30 is executed through the image sensor 14, A/D converter 16, image-processing unit 20, and memory control unit 22, or directly through the memory control unit 22 from the A/D converter 16. Development processing for executing various kinds of processing operations by reading out image data written in the memory 30 is executed using the image-processing unit 20, as needed. With the exposure processing and development processing, image-capturing processing is executed.

As the image-capturing processing in step S129 is executed, the process advances to step S130 to determine whether the image flag is ON by detecting the state of the quick-review ON/OFF switch in advance. If the image-display flag is ON, the process advances to step S133 to determine whether the red-eye correction flag is set while the red-eye correction switch is ON in step S110. If the result is YES in step S133, red-eye automatic correction is executed in step S134. The process advances to step S135 to execute quick-review display of the image having undergone red-eye automatic correction. Details of red-eye automatic correction will be described later with reference to the flowchart shown in FIG. 4. If the result is NO in step S133, the process directly advances to step S135 to execute quick-review display of the image which has not undergone red-eye correction. The state in which the image-display flag is ON in step S130 is a state in which the image-display unit 28 is always displayed as an electronic viewfinder even during image capture, and also executes quick-review display even immediately after image capture.

If the image-display flag is OFF in step S130, the process advances to step S131 to see if a quick-review flag is ON. If the quick-review flag is ON, the process advances to step S132 to set image display of the image-display unit 28 to ON, and then to perform the processing operations in steps S133 to S135. The process advances to step S136.

If the image-display flag is OFF in step S130 and the quick-review flag is also OFF in step S131, the process advances to recording (storage) processing in step S136 while the image-display unit 28 is kept OFF. In this case, even after image capture, the image-display unit 28 is kept OFF, and does not execute quick-review display. This method of use places importance on power saving by omitting the use of the electronic-viewfinder function of the image-display unit 28 when confirmation of a captured image immediately after image capture is unnecessary, like when image capture is to be continued using the optical viewfinder 104.

In step S136, the captured-image data written in the memory 30 is read out and various kinds of image-processing operations are executed using the memory control unit 22 and even the image-processing unit 20, as needed. The compression/expansion unit 32 executes image compression corresponding to the set mode. After that, recording processing for writing the compressed image data to the storage medium 200 or 210 is executed.

When the recording processing in step S136 is complete, the process advances to step S137 to check whether the shutter switch SW2 64 is in the pressed state. If the shutter switch SW2 64 is pressed, the process advances to step S138 to determine the continuous-shooting flag state. If the continuous-shooting flag is ON, image capture is to be continuously executed. The process advances to step S129 to capture the next video image. If the continuous-shooting flag is OFF in step S138, the process returns to step S137 to repeat the processing operations in steps S137 and S138 until the shutter switch SW2 64 is released.

If the shutter switch SW2 64 is turned off in step S137, the process advances to step 8139. The process waits until a predetermined minimum review time elapses, and then advances to step S140. It is determined in step S140 whether the image-display flag is ON. If the image-display flag is ON, the process advances to step S141 to set the display state of the image-display unit 28 to the through display state. The process advances to step S143. In this case, the through display state can be set in which after a captured image is confirmed by quick-review display on the image-display unit 28, captured image data are sequentially displayed for the next image capture. If the image-display flag is OFF in step S140, the process advances to step S142 to set display of the image-display unit 28 to OFF and the process advances to step S143. In this case, the captured image is confirmed by quick-review display on the image-display unit 28. After that, the function of the image-display unit 28 is stopped to save the power. This makes it possible to reduce the power consumed by the image-display unit 28 and D/A converter 26, which consume a large amount of power.

It is determined in step S143 whether the shutter switch SW1 62 is ON. If the shutter switch SW1 62 is ON in step S143, the process returns to step S125 to prepare for the next image capture. If the shutter switch SW1 62 is OFF in step S143, the series of image capturing operations end. The process returns to step S103 in FIG. 3A.

Figure 4:
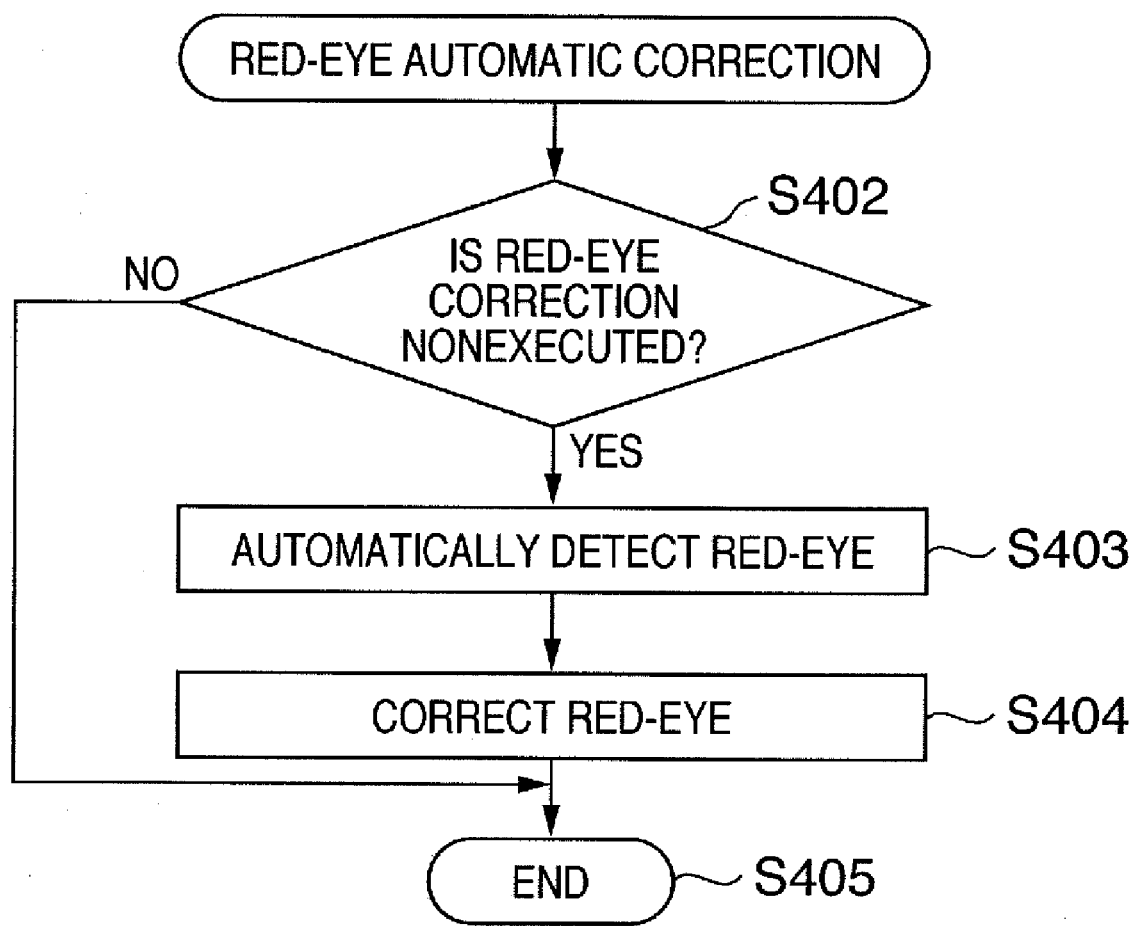
FIG. 4 is a flowchart showing a red-eye automatic correction procedure in step S134 of FIG. 3C.

FIG. 4 is a flowchart showing a red-eye automatic correction procedure in step S134 of FIG. 3C. The red-eye correction processing in step S134 is executed in REC review immediately after image capture.

When the user captures an image using an electronic flash by the camera, the image may have a red-eye. If the red-eye correction flag is set in step S133 of FIG. 3C, red-eye automatic correction is executed.

It is automatically determined in step S402 whether red-eye correction of the target image is nonexecuted. If the result is NO (red-eye correction is already done) in step S402, the process advances to step S405 to end the red-eye automatic correction operation. Once red-eye region correction is executed, the red-eye region is already corrected. When another red-eye automatic correction is executed, a lip or the like other than an eye is mistaken for a red-eye region, resulting in erroneous correction.

If the result is YES (red-eye correction is nonexecuted) in step S402, the process advances to step S403. Note that this description applies to REC review immediately after image capture, so any situation except for "red-eye correction is nonexecuted" is impossible. Although a detailed description of red-eye automatic detection in step S403 will be omitted, a face detection technique disclosed in Japanese Patent Laid-Open No. 10-232934 or 2000-48184 is used to detect a face, discriminate an eye region, and correct a red-eye in step S404. More specifically, a region expected to be a human eye considering its position and shape is specified using edge information, and a subregion which falls within the specified region and has a brightness, color saturation, and hue that satisfy a predetermined condition is recognized as a red-eye. Although a detailed description of red-eye correction will be omitted, a technique disclosed in Japanese Patent No. 3684017 is available as an example to change the brightness and color saturation or the hue of the region recognized as a red-eye. When red-eye automatic detection and correction are complete, the red-eye automatic correction routine ends in step S405.

Figure 5:
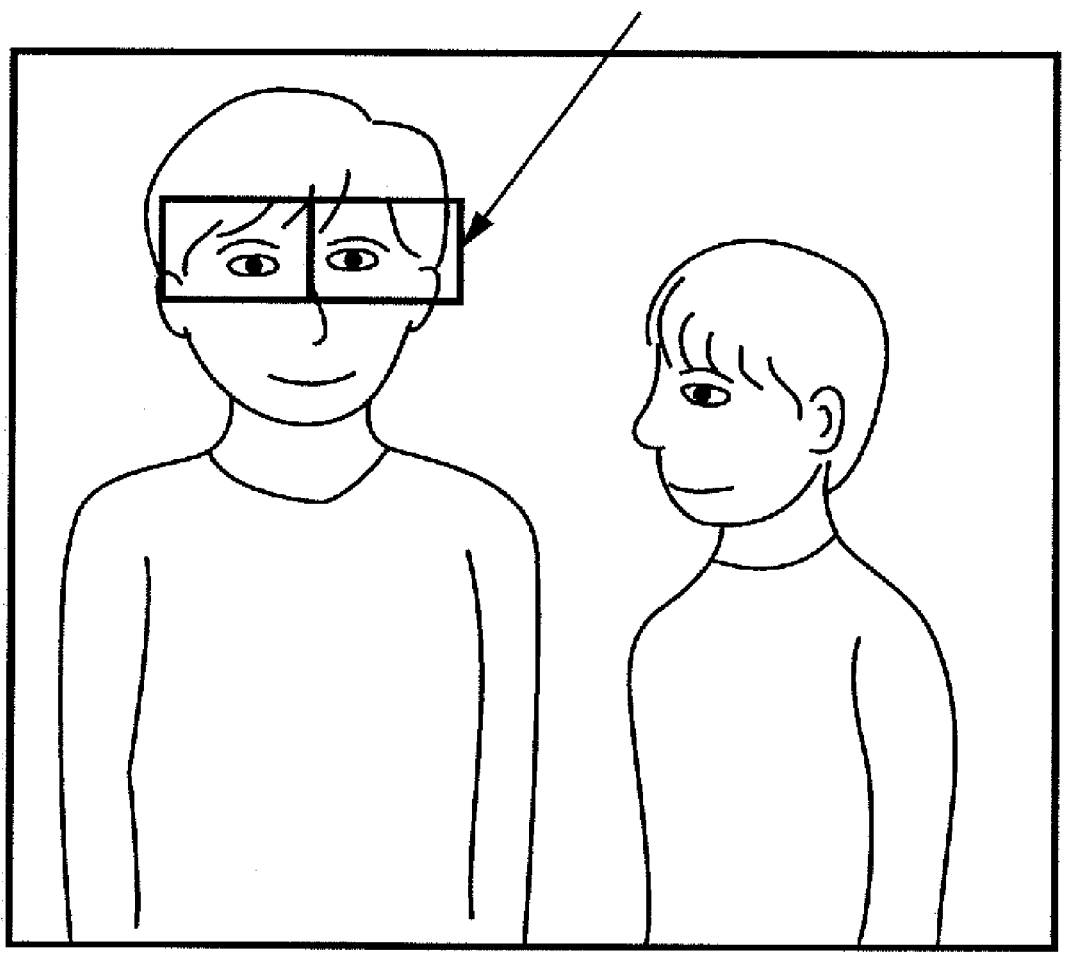
FIG. 5 is a view showing a quick review window after red-eye automatic correction.

As shown in FIG. 5, the quick-review window in step S135 of FIG. 3C after red-eye automatic correction displays a frame at a red-eye region having been corrected by red-eye automatic detection. That is, an eye region where a frame is displayed has undergone red-eye automatic correction, and an eye region where no frame is displayed has not undergone red-eye automatic correction.

Figure 6:
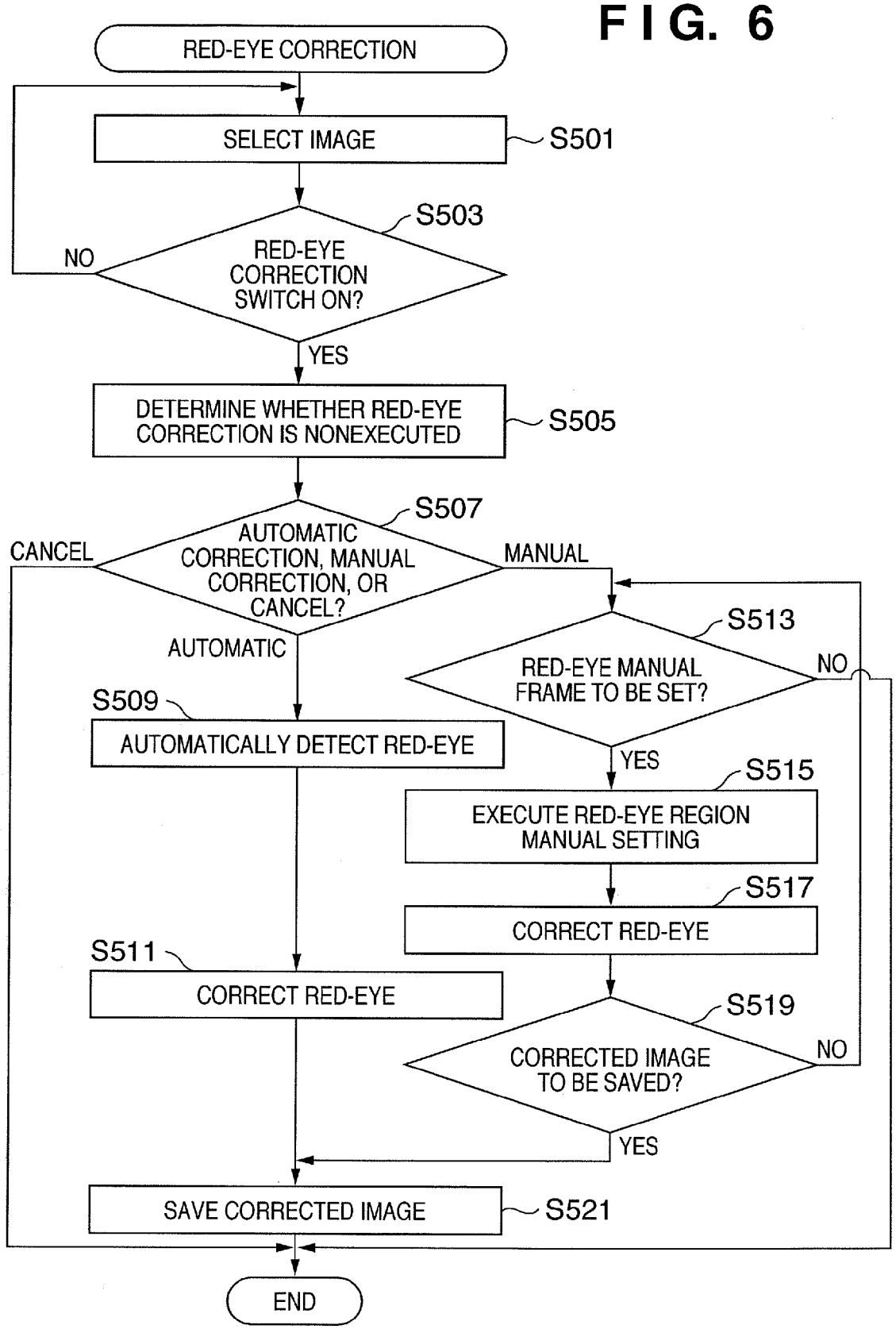
FIG. 6 is a flowchart showing the procedure when a red-eye in a captured image is corrected while playing it back.

FIG. 6 is a flowchart showing the procedure when a red-eye in a captured image is corrected while playing it back.

The DISP button 308 (see FIG. 2) of the digital camera 100 is pressed to set a playback mode and select a red-eye correction target image in step S501. When the user selects the target image, it is determined whether the red-eye correction ON/OFF switch 69 (see FIG. 2) is pressed, and the process waits until the red-eye correction ON/OFF switch 69 is pressed in step S503.

Figure 7:
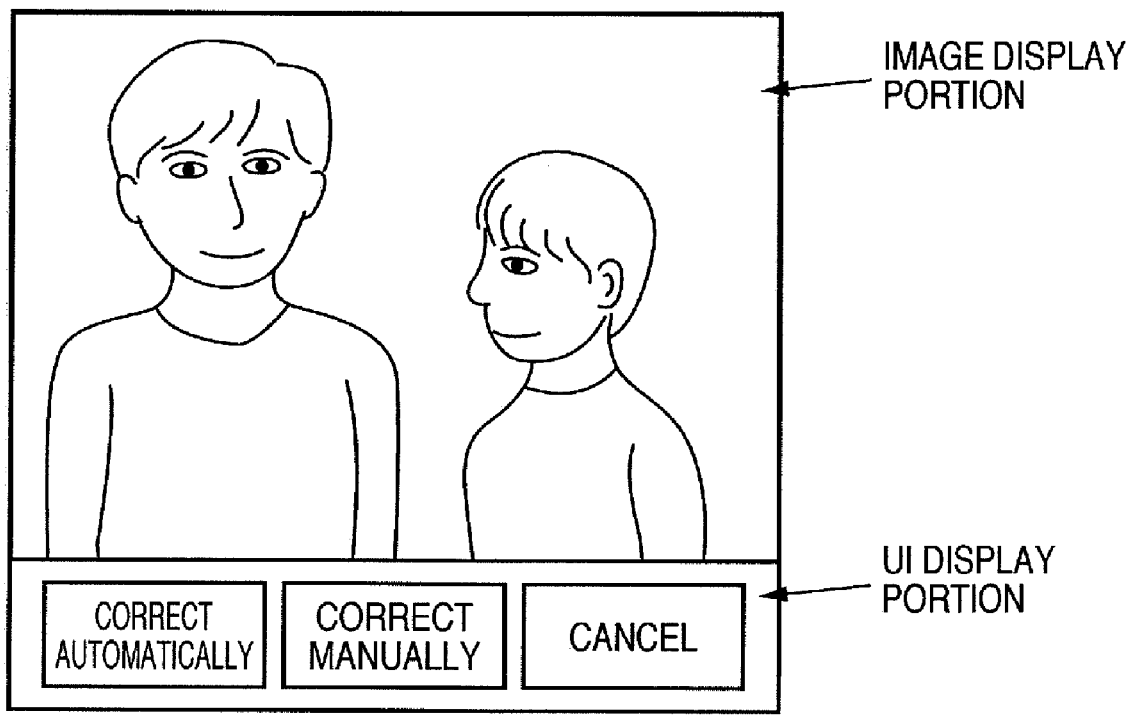
FIG. 7 is a window to select whether to automatically or manually correct a red-eye or cancel.
Figure 8:
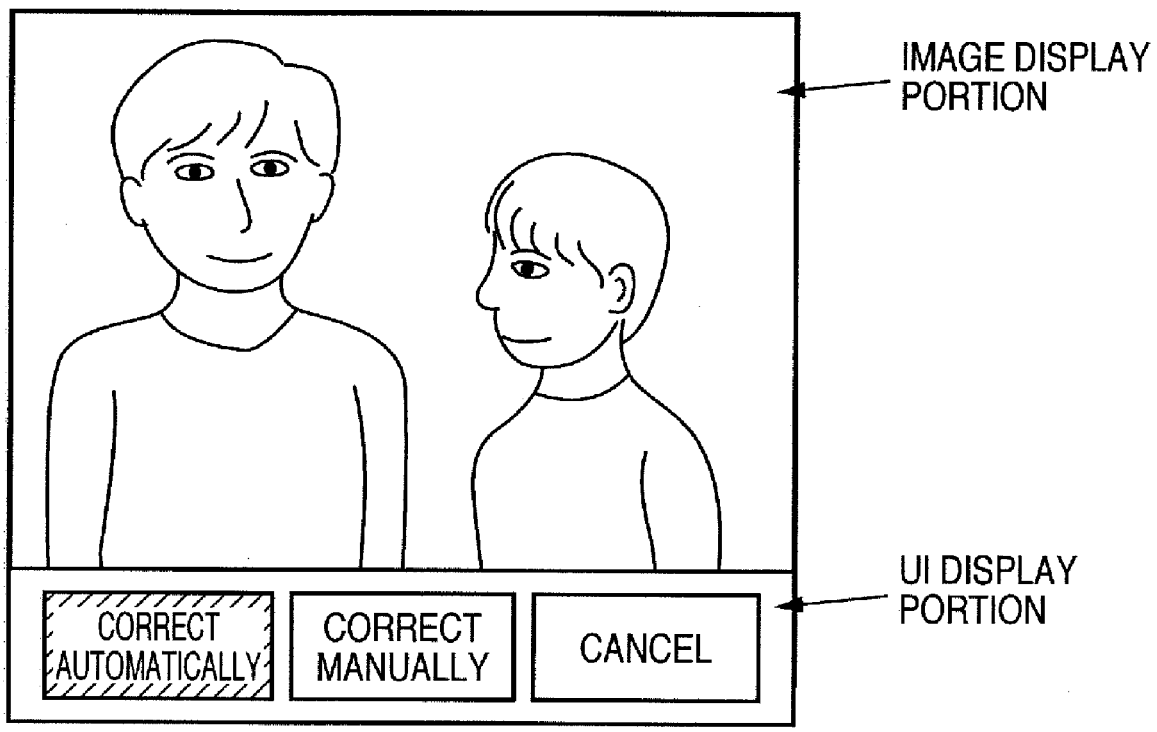
FIG. 8 is a view showing a window to select whether to manually correct a red-eye or cancel.

If the result is YES in step S503, it is automatically determined in step S505 whether red-eye correction of the target image is nonexecuted. How to determine whether a target image has already undergone red-eye correction will be described later. If the target image has not undergone red-eye correction yet, a window to select whether to automatically or manually correct a red-eye or cancel is displayed on an image-display portion of the LCD 304 as shown in FIG. 7. If the target image has already undergone red-eye correction, an icon for selecting automatic correction is displayed in gray or the like on the selection window to allow selection of only manual correction or cancel, as shown in FIG. 8. Once red-eye region correction is executed irrespective of automatic or manual correction, the red-eye region is already corrected. When another red-eye automatic correction is executed, there is a higher probability that a lip or the like other than an eye is mistaken for a red-eye region.

The user then selects whether to automatically or manually correct or cancel while looking at the selection window shown in FIG. 7 or 8. As described above, if the target image has already undergone red-eye correction, the user cannot select red-eye automatic correction in step S507 as shown in FIG. 8.

If the user selects cancel in step 8507, the red-eye correction routine ends without executing anything.

If the user selects automatic correction in step S507, the process advances to step S509 to automatically detect a red-eye. Although a detailed description of red-eye automatic detection will be omitted, the face detection technique disclosed in Japanese Patent Laid-Open No. 10-232934 or 2000-48184 is used to detect a face, discriminate an eye region, and correct a red-eye (S511). Although a detailed description of red-eye correction will be omitted, the technique disclosed in Japanese Patent No. 3684017 is available as an example.

When red-eye automatic detection and correction are complete, a frame at a red-eye region having been corrected by red-eye automatic detection is displayed as shown in FIG. 5. That is, an eye region where a frame is displayed has undergone red-eye automatic correction, and an eye region where no frame is displayed has not undergone red-eye automatic correction.

The process advances to step S521 to save the image after red-eye correction, and the red-eye correction routine ends.

Figure 9:
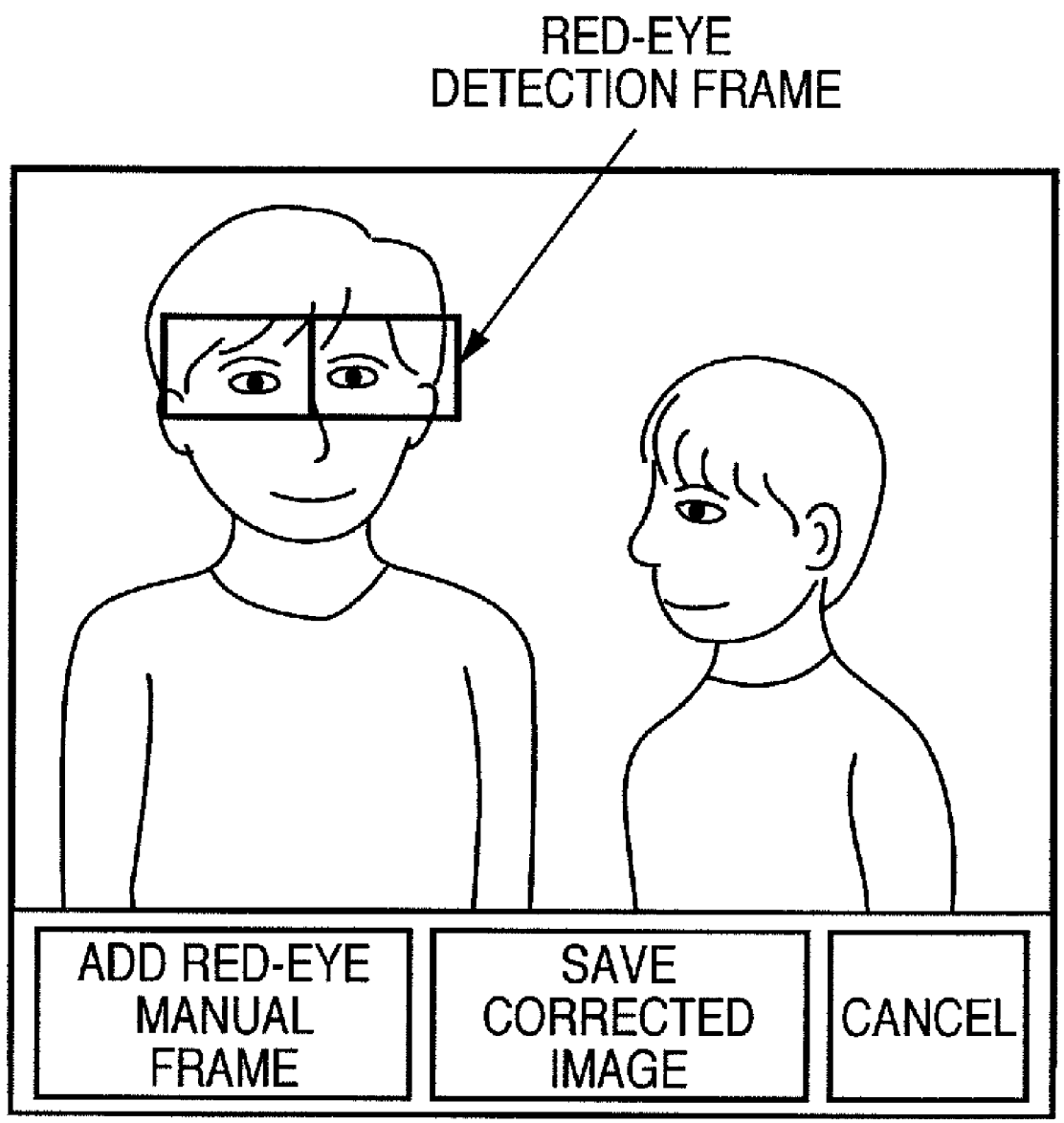
FIG. 9 is a view showing a window when the user selects red-eye manual correction.

If the user selects manual correction in step S507, and the target image has already undergone red-eye correction even once, a frame is displayed at a red-eye region having been corrected previously, as shown in FIG. 9. The user selects in step S513 whether to set a red-eye manual frame while checking the image shown in FIG. 9. If there is no red-eye region to be corrected in the image shown in FIG. 9, the process advances to corrected image saving in step S521, and the red-eye correction routine directly ends.

Figure 10B:
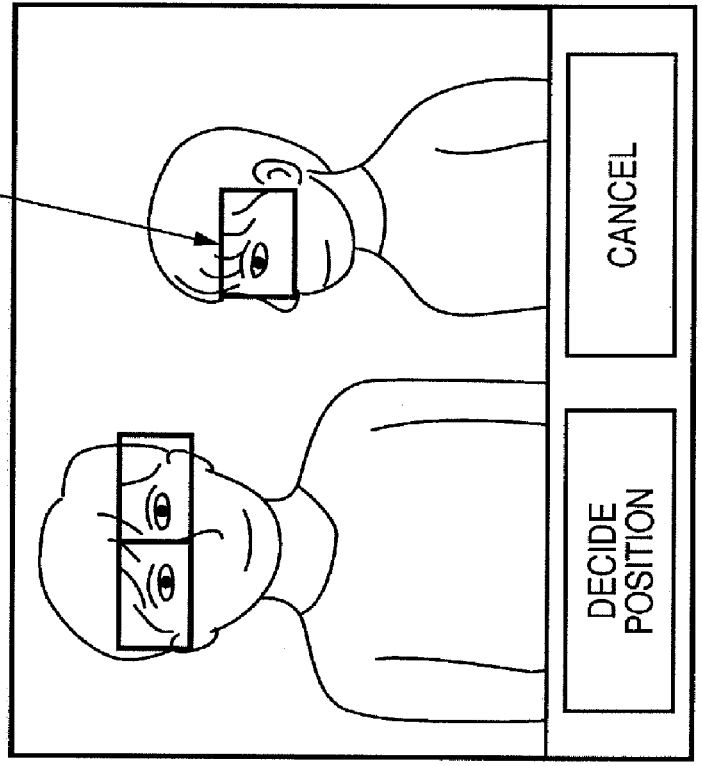
FIGS. 10A and 10B are views showing windows after the user selects an "add red-eye manual frame" button shown in FIG. 9.

If the user selects to execute red-eye manual frame addition in FIG. 9 (which corresponds to red-eye manual frame setting execution in step S513), a red-eye region manual setting in step S515 is executed to set a red-eye manual frame so as to designate the red-eye region. Red-eye manual frame addition will be explained here with reference to FIGS. 10A and 10B.

Figure 10A:
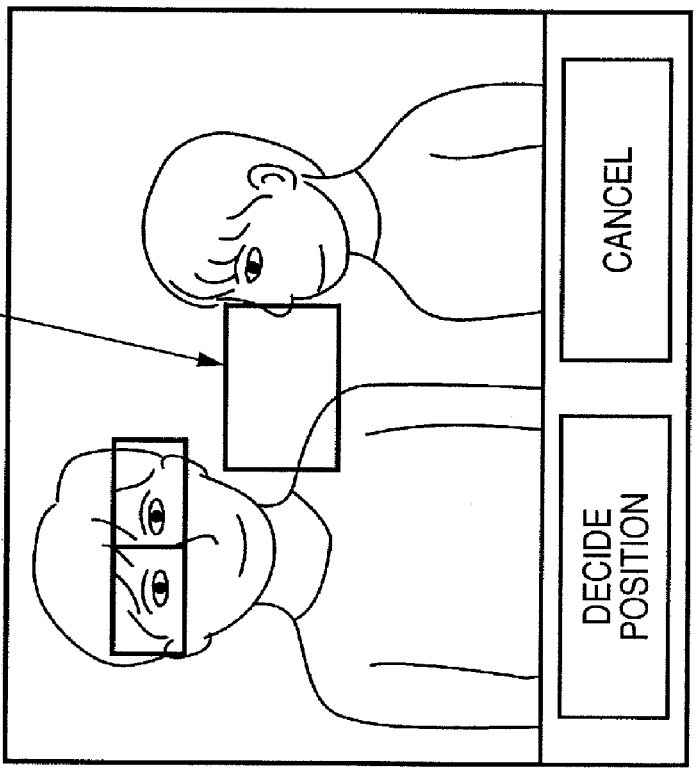
Figure 11:
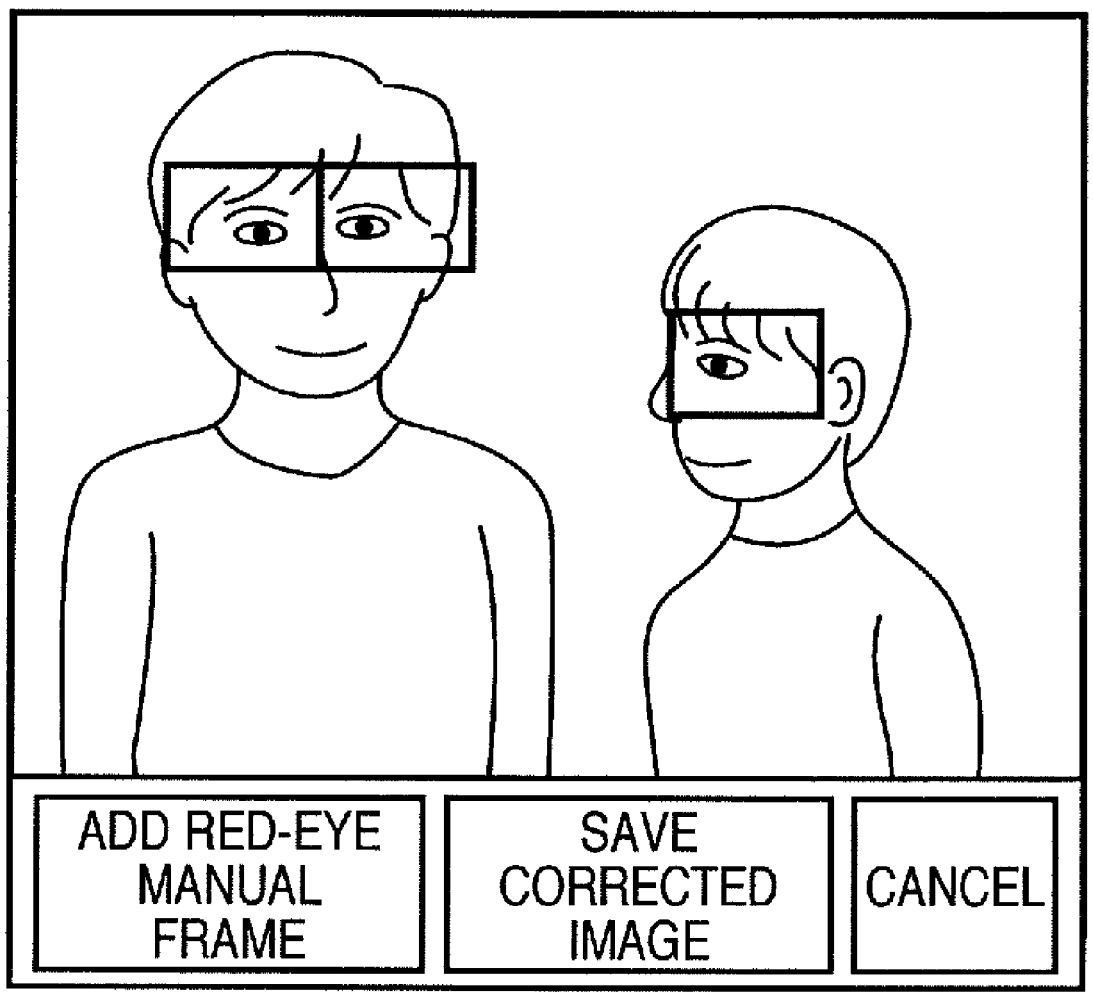
FIG. 11 is a view showing a window after the user selects a "decide position" button of a red-eye manual addition frame.

FIG. 10A is a view showing a window after the user selects an "add red-eye manual frame" button shown in FIG. 9. A red-eye manual addition frame is displayed with a preset size at the central portion of the window. The user moves the red-eye manual addition frame using the cross button on the back surface of the camera. The zoom lever allows for change in size of the red-eye manual addition frame. When the user decides on the position and size of the red-eye manual addition frame and selects a "decide position" button shown in FIG. 10B, a window shown in FIG. 11 appears. A red-eye region is extracted from the set region to correct the red-eye region in step S517. When the user wants to add another red-eye region, he/she must select and execute red-eye manual frame addition in FIG. 11 again. When red-eye manual frame addition is unnecessary, the user selects a "save corrected image" button in step S519.

If corrected image saving is selected, the corrected image is saved as a file in step S521 and the routine ends. At this time, information indicating that red-eye correction has already been executed is written in the header area of the file. Note that the operation for writing information indicating that red-eye correction has already been executed is also applied when red-eye automatic correction is performed in quick review or playback.

How to write information (to be referred to as correction execution information hereinafter) indicating whether a target image file has undergone red-eye correction and how to determine, based on the red-eye correction execution information, whether the target image file has undergone red-eye correction will be explained here.

Information (to be referred to as red-eye correction execution information hereinafter) indicating whether red-eye correction has already been executed is written together with the image data to be saved in a file as JPEG image data. More specifically, the red-eye correction execution information and image data are held in the same file but separately from each other by a method based on the Exif (Exchangeable image file format for digital still cameras) standard.

The red-eye correction execution information according to this embodiment is stored in a private tag area using a method based on a private tag of the Exif standard. Even when an apparatus or application cannot interpret the information stored in the private tag area, it may neglect the information attached to this tag. No problem arises because even the apparatus or application which has no capability to interpret the red-eye correction execution information can access normal image data alone. Hence, the method based on the Exif standard is very effective in holding such JPEG image data and red-eye correction execution information in the same file.

In this embodiment, a red-eye correction execution information tag RedEyeTag is prepared in a private tag area in advance. When red-eye correction is nonexecuted, RedEyeTag is set to 0. If red-eye correction has been executed, RedEyeTag is set to 1 and is written in the private tag area. That is, it is possible to determine that red-eye correction is nonexecuted when RedEyeTag is 0, and that red-eye correction has already been executed when RedEyeTag is 1.

As has been described above, according to the embodiment, in the red-eye correction processing, execution of red-eye correction for an image file which has already undergone red-eye correction is suppressed. This makes it possible to lower the probability of erroneous red-eye correction. In addition, the user can set a red-eye region by a red-eye manual frame setting even for a file which has already undergone red-eye correction. This makes it possible to easily correct a red-eye that is not automatically detected and corrected.

In the above description, the digital camera 100 executes the operations in the flowchart shown in FIG. 6. However, the present invention is not limited to this. A personal computer, image-processing apparatus, or the like outside the digital camera may execute the operations in the flowchart shown in FIG. 6 to perform red-eye correction processing.

Although the processing for inhibiting red-eye automatic correction for an image file which has already undergone red-eye correction has been described as an example, the present invention is not limited to this.

Figure 12:
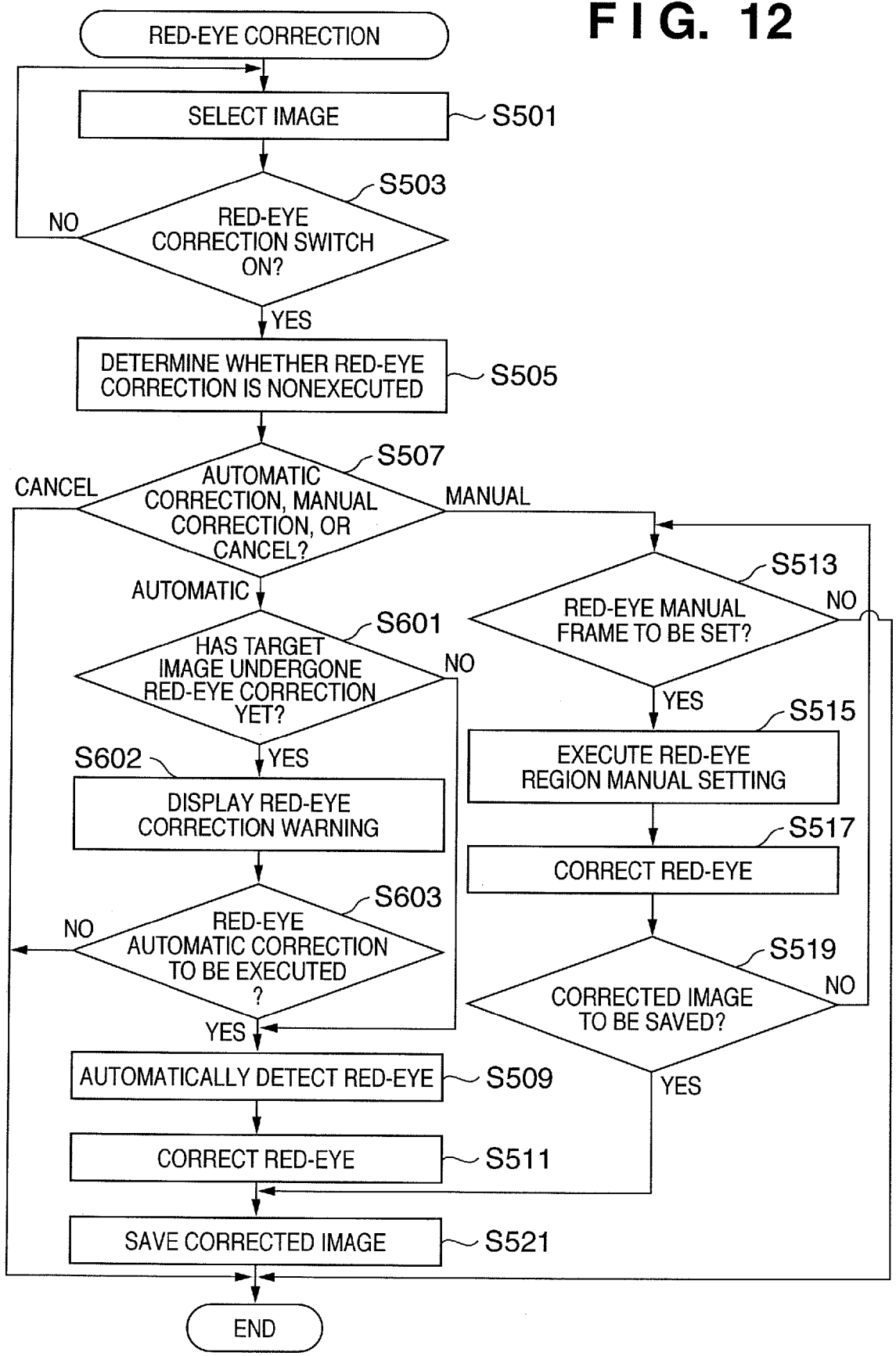
FIG. 12 is a flowchart showing the procedure of another processing when a captured image undergoes red-eye correction while being played back.

FIG. 12 is a flowchart showing processing for, when an image file which has already undergone red-eye correction is to undergo red-eye automatic correction, prompting the user to confirm the necessity of red-eye automatic correction. Of the steps in FIG. 12, the same step numbers as in FIG. 6 denote the same processing operations in FIG. 12.

However, since this processing allows red-eye automatic correction even for an image file which has already undergone red-eye correction, the window shown in FIG. 7 is always displayed to be able to select automatic correction in step S507.

If automatic correction is selected in step S507, the process advances to step S601. If the target image has not undergone red-eye correction yet, the process advances to step S509. The target image undergoes red-eye automatic detection in step S509, and undergoes red-eye correction in step S511.

Figure 13:
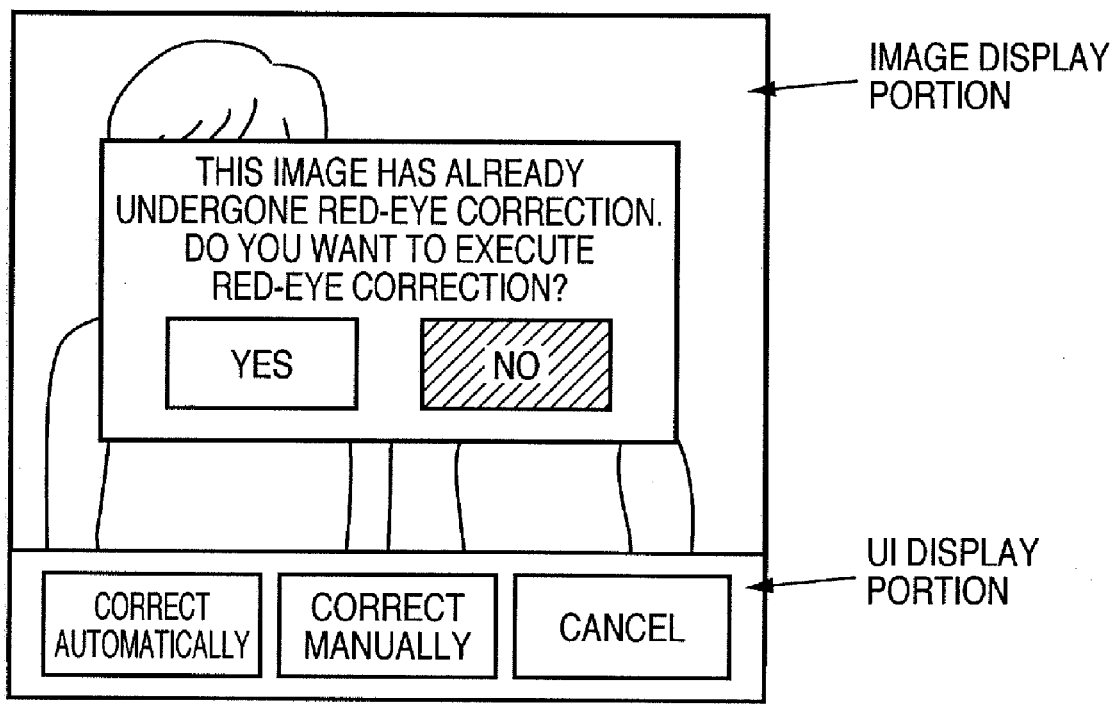
FIG. 13 is a view showing a window to select whether to execute or cancel red-eye correction.

If the target image has already undergone red-eye correction in step S601, a message indicating such is displayed in step S602 as shown in FIG. 13. At this time, a window to select whether to execute red-eye correction is also displayed. The user selects whether to execute or cancel red-eye correction using this selection window.

If the user selects to cancel red-eye correction in step S603, the procedure in this flowchart ends. If the user selects to execute red-eye correction in step S603, the process advances to step S509 to automatically detect a red-eye in this target image.

In this manner, when an image file which has already undergone red-eye correction is to undergo automatic red-eye correction, the user confirms the necessity of red-eye correction execution once. This prevents the user from executing red-eye automatic correction processing a plurality of times of for the same image file without careful consideration. It is therefore possible to lower the probability of erroneous correction.

Figure 14:
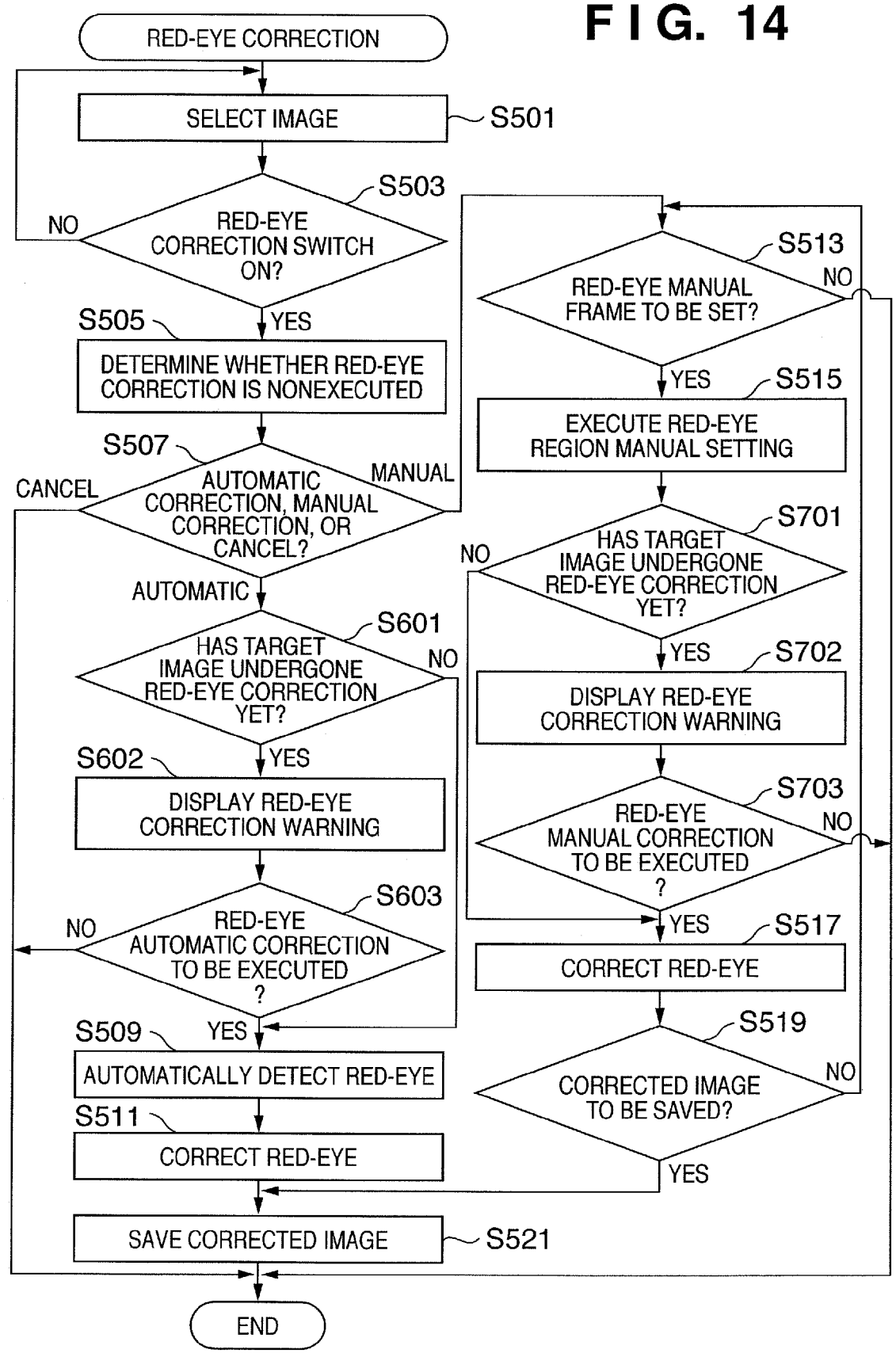
FIG. 14 is a flowchart showing the procedure of still another processing when a captured image undergoes red-eye correction while being played back.

FIG. 14 is a flowchart showing processing for, when a region which has already undergone red-eye correction falls within the set red-eye manual frame, prompting the user to confirm the necessity of red-eye correction. The same step numbers as in FIG. 12 denote the same processing operations in FIG. 14.

If red-eye manual correction is selected in step S507, and a red-eye manual frame is set in steps S513 and S515, it is determined in step S701 whether a region which has already undergone red-eye correction falls within the red-eye manual frame.

If the region which has already undergone red-eye correction falls within the red-eye manual frame, a message indicating it is displayed in step S702 as shown in FIG. 15. At this time, a window to select whether to execute red-eye correction is also displayed. The user selects whether to execute or cancel red-eye correction using this selection window.

If the user selects to cancel red-eye correction in step S703, the procedure in this flowchart ends. If the user selects to execute red-eye correction in step S703, the process advances to step S517 to extract a red-eye region from this red-eye manual frame and correct the red-eye region.

In this manner, when a region which has already undergone red-eye correction is to undergo manual red-eye correction, the user confirms the necessity of red-eye correction execution once. This prevents the user from executing red-eye automatic correction processing a plurality of times of for the same region without careful consideration. It is therefore possible to lower the probability of erroneous correction.

Other Embodiment

The object of the embodiment is achieved even by the following method. That is, a storage medium (or recording medium) which records software program codes for implementing the functions of the above-described embodiment is supplied to the system or apparatus. The computer (or CPU or MPU) of the system or apparatus reads out and executes the program codes stored in the storage medium. In this case, the program codes read out from the storage medium implement the functions of the above-described embodiment by themselves. In addition to the case in which the functions of the above-described embodiment are implemented when the readout program codes are executed by the computer, the present invention may be embodied in the following case. That is, the functions of the above-described embodiment are implemented when the operating system (OS) running on the computer performs part or all of actual processing based on the instructions of the program codes.

The present invention may also be embodied in the following case. That is, the program codes read out from the storage medium are written in the memory of a function expansion card inserted into the computer or a function expansion unit connected to the computer. After that, the functions of the above-described embodiment are implemented when the CPU of the function expansion card or function expansion unit performs part or all of actual processing based on the instructions of the program codes.

When the present invention is embodied in the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-095851, filed Mar. 30, 2006, which is hereby incorporated by reference herein in its entirety.

What is claimed is:

1. An image-processing apparatus comprising,
a processing circuit which executes correction processing for correcting a region in a target image, which satisfies a condition that defines a correction target;
a determination circuit which determines whether the target image has already undergone the correction processing; and
a correction suppression circuit which suppresses execution of the correction processing for the target image when said determination circuit determines that the target image has already undergone the correction processing, wherein
said processing circuit executes first correction processing for automatically detecting the region which satisfies the condition that defines the correction target from the target image and correcting the region, and second correction processing for correcting a region in the target image, which is designated by a user, and
said correction suppression circuit suppresses execution of the first correction processing for the target image when said determination circuit determines that the target image has already undergone at least one of the first correction processing and the second correction processing.

2. The apparatus according to claim 1, wherein the region which satisfies the condition that defines the correction target is a red-eye region.

3. The apparatus according to claim 2, further comprising a display unit which displays a window to allow the user to select the red-eye region from the target image.

4. The apparatus according to claim 3, wherein when the target image has already undergone at least one of the first correction processing and the second correction processing, said display unit displays, on the target image, a frame indicating a portion which has already undergone correction.

5. The apparatus according to claim 2, wherein said correction suppression circuit suppresses execution of the first correction processing for the target image when said determination circuit determines that the target image has already undergone at least one of the first correction processing and the second correction processing.

6. An image-capturing apparatus comprising:
an image sensor which photoelectrically converts an object image;
a storage circuit which stores the image sensed by said image sensor; and
a processing circuit which executes correction processing for correcting a region in a target image, which satisfies a condition that defines a correction target;
a determination circuit which determines whether the target image has already undergone the correction processing; and
a correction suppression circuit which suppresses execution of the correction processing for the target image when said determination circuit determines that the target image has already undergone the correction processing, wherein
said processing circuit executes first correction processing for automatically detecting the region which satisfies the condition that defines the correction target from the target image and correcting the region, and second correction processing for correcting a region in the target image, which is designated by a user, and
said correction suppression circuit suppresses execution of the first correction processing for the target image when said determination circuit determines that the target image has already undergone at least one of the first correction processing and the second correction processing.

7. The apparatus according to claim 6, wherein the region which satisfies the condition that defines the correction target is a red-eye region.

8. An image-processing method comprising:
a correction step of correcting a region in a target image, which satisfies a condition that defines a correction target,
a determination step of determining whether the target image has already undergone correction in the correction step; and
a correction suppression step of suppressing execution of correction for the target image in the correction step when it is determined in the determination step that the target image has already undergone correction in the correction step, wherein
the correction step includes a first correction step of automatically detecting the region which satisfies the condition that defines the correction target from the target image and correcting the region, and a second correction step of correcting a region in the target image, which is designated by a user,
execution of correction for the target image in the first correction step is suppressed in the correction suppression step when it is determined in the determination step that the target image has already undergone correction in at least one of the first correction step and the second correction step and
wherein said processing method is performed utilizing a computer processor.

9. The method according to claim 8, wherein the region which satisfies the condition that defines the correction target is a red-eye region.

10. The method according to claim 9, further comprising a display step of displaying a window to allow the user to select the red-eye region from the target image.

11. The method according to claim 9, wherein when the target image has already undergone correction in at least one of the first correction step and the second correction step, a frame indicating a portion which has already undergone correction is displayed on the target image in the display step.

* * * * *